United States Patent
Lee

(10) Patent No.: US 8,266,715 B2
(45) Date of Patent: Sep. 11, 2012

(54) METHOD FOR EXECUTING DIGITAL RIGHT MANAGEMENT AND TRACKING USING CHARACTERISTIC OF VIRUS AND SYSTEM FOR EXECUTING THE METHOD

(75) Inventor: Woo Sung Lee, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 852 days.

(21) Appl. No.: 12/301,981

(22) PCT Filed: Mar. 27, 2007

(86) PCT No.: PCT/KR2007/001475
§ 371 (c)(1),
(2), (4) Date: Nov. 21, 2008

(87) PCT Pub. No.: WO2007/139277
PCT Pub. Date: Dec. 6, 2007

(65) Prior Publication Data
US 2010/0235925 A1    Sep. 16, 2010

(30) Foreign Application Priority Data
May 26, 2006 (KR) .................. 10-2006-0047452

(51) Int. Cl.
*G06F 17/00* (2006.01)
*G06F 21/00* (2006.01)

(52) U.S. Cl. ............... 726/30; 726/26; 726/22; 726/23; 726/24; 726/25; 713/188; 713/187

(58) Field of Classification Search ................. None
See application file for complete search history.

(56) References Cited

FOREIGN PATENT DOCUMENTS

| | | |
|---|---|---|
| JP | 2002-244927 | 8/2002 |
| JP | 2002-258782 | 9/2002 |
| JP | 2002-373261 | 12/2002 |
| JP | 2003-256596 | 9/2003 |
| JP | 2004-355258 | 12/2004 |
| JP | 2006-085696 | 3/2006 |
| KR | 10-2000-0030679 | 6/2000 |
| KR | 10-2002-0066645 | 8/2002 |
| KR | 10-2002-0088737 | 11/2002 |
| KR | 10-2004-0003809 | 1/2004 |
| KR | 10-2006-0013099 | 2/2006 |
| WO | WO 02-086725 | 10/2002 |
| WO | WO 2004-019191 | 3/2004 |

*Primary Examiner* — Fikremariam A Yalew
(74) *Attorney, Agent, or Firm* — H.C. Park & Associates, PLC

(57) ABSTRACT

A method of performing Digital Rights Management (DRM) and tracking using a virus characteristic and a system for executing the method are provided. The method of performing DRM and tracking with respect to a digital content, includes the steps of: providing a DRM code to the digital content in a DRM system, wherein the DRM code includes a virus characteristic; and performing the DRM and tracking with respect to the digital content, based on DRM information, wherein the DRM information is generated based on the DRM code.

21 Claims, 11 Drawing Sheets

PRIOR ART

METHOD FOR EXECUTING DIGITAL RIGHT MANAGEMENT AND TRACKING USING CHARACTERISTIC OF VIRUS AND SYSTEM FOR EXECUTING THE METHOD

CROSS REFERENCE TO RELATED APPLICATIONS

This application is a U.S. National Phase Application of International Application PCT Application No. PCT/KR2007/001475 filed on Mar. 27, 2007, which claims the benefit of priority from Korean Patent Application No. 10-2006-0047452 filed on May 26, 2006. The disclosures of International Application PCT Application No. PCT/KR2007/001475 and Korean Patent Application No. 10-2006-0047452 are incorporated herein by reference.

TECHNICAL FIELD

The present invention relates to a method and system for performing Digital Rights Management (DRM) and tracking using a virus characteristic, and more particularly, to a method of performing DRM and tracking by providing a DRM code with a virus characteristic to a digital content and transmitting various types of information from the DRM code to a DRM system when the digital content is played wherein the virus characteristic is provided in another program and privately performs a function, and a DRM system for executing the method.

BACKGROUND ART

In a related art, Digital Rights Management (DRM) indicates a technology and a service which prevents an unauthorized utilization of a digital content and thereby protects revenues and rights of those concerned with copyrights.

Specifically, DRM indicates a technology which can securely protect revenues and rights of a content provider, prevent illegal copies of a content, and also can support generation of the content, distribution thereof, management thereof, and the like, such as a billing service, a payment, and the like. In this instance, DRM includes a DRM technology enabling only an authorized user to utilize a content and pay a fee, a software and security technology for approving and executing playback of copyrighted content, a billing/payment technology, and the like. Napster, a music download service provider, initially employed DRM to protect MP3 copyrights in the year 2001. Also, as online contents start being paid for and thereby become an important technology, Massachusetts Institute of Technology in the United States published DRM as one of ten future key information technologies.

FIG. 1 is a schematic diagram illustrating a method of performing DRM according to a conventional art. As shown in FIG. 1, a DRM system 101 connects with a provider (CP/ISP) 103 providing a content 102 and a payment system 104, for example, a payment gateway, and thereby provides the content 102. Also, the DRM system 101 encrypts the content 102 and transmits the encrypted content 102 to a user terminal 105.

To play the encrypted content 102, a browser provided from the provider 103 must be installed in the user terminal 105. In this instance, the browser performs functions, such as prevention of an illegal copy, restriction on a number of plays, restriction on a secondary distribution of the content 102 via the user terminal 105, and the like.

However, in the conventional art, DRM may never acquire information about where and how many times digital contents, such as moving pictures, music contents, advertisements, and the like, have been played. Even when a program is installed in a corresponding digital content to solve the above problem, file size of the digital content may be increased. Also, digital content quality may be deteriorated.

Also, in the conventional art, DRM is dependent on a universal player to play a digital content and thus the digital content may not be played in the universal player depending upon installation of a program as described above.

Also, when providing an advertisement in a digital content, an existing advertisement providing method generally depends on a form of a moving picture format and the universal player. Accordingly, an advertiser may neither arbitrarily provide the advertisement in the digital content nor track a distribution level of the advertisement.

DISCLOSURE OF INVENTION

Technical Goals

An aspect of the present invention provides a method of performing Digital Rights Management (DRM) and tracking by using a virus characteristic, and a system for performing the method.

Another aspect of the present invention is to identify a distribution level and utilization level of a digital content based on DRM information, and also perform DRM and tracking by providing a DRM code in the digital content, generating the DRM information associated with the digital content from the DRM code when the digital content is played, and transmitting the generated DRM information to a DRM system. In this instance, the DRM code includes a virus characteristic.

Another aspect of the present invention is to perform DRM and tracking with respect to a digital content, independently from a universal player, since there is minimal change in file size and quality of the digital content, and also the digital content is playable in the universal player regardless of whether the DRM code is included.

Another aspect of the present invention is to enable an advertiser to track an advertisement and thereby readily utilize information to measure advertising effect of the advertisement when the advertisement is provided in the digital content with a DRM code or when the digital content corresponds to the advertisement.

Technical Solutions

According to an aspect of the present invention, there is provided a method of performing Digital Rights Management (DRM) and tracking with respect to a digital content, the method including the steps of: providing a DRM code to the digital content in a DRM system, wherein the DRM code includes a virus characteristic; and performing the DRM and tracking with respect to the digital content, based on DRM information, wherein the DRM information is generated based on the DRM code.

In this instance, the DRM code may perform a DRM function when the digital content is played using the virus characteristic. In this instance, the virus characteristic is provided in another program and privately performs a function.

Also, the DRM function may include a function of generating the DRM information associated with the digital content, and a function of transmitting the DRM information to the DRM system.

Also, the DRM information may include an Internet Protocol (IP) address, a play time of the digital content, a number of plays thereof, and a number of distributions thereof, and the step of performing may include the steps of: receiving the DRM information from a terminal which downloads the digital content; extracting the IP address, the play time, the number of plays, and the number of distributions from the DRM information; and identifying a distribution level and a utilization level of the digital content by analyzing the extracted IP address, the play time, the number of plays, and the number of distributions.

According to another aspect of the present invention, there is provided a method of performing a DRM function by a DRM code, the method including the steps of: generating DRM information associated with a digital content when the digital content is played; and transmitting the DRM information to a DRM system associated with the digital content.

According to still another aspect of the present invention, there is provided a system for performing DRM and tracking with respect to a digital content, the system including: a DRM code providing component configured to provide a DRM code to the digital content in a DRM system, wherein the DRM code includes a virus characteristic; and a DRM and tracking performing component configured to perform the DRM and tracking with respect to the digital content, based on DRM information, wherein the DRM information is generated based on the DRM code.

In the present invention, the term "digital content" indicates various types of references and information which manufactures, processes, and distribute characters, voice, sound, images, and the like using a digital scheme to utilize in the Internet or a communication network.

BEST MODE FOR CARRYING OUT THE INVENTION

Figure 1:
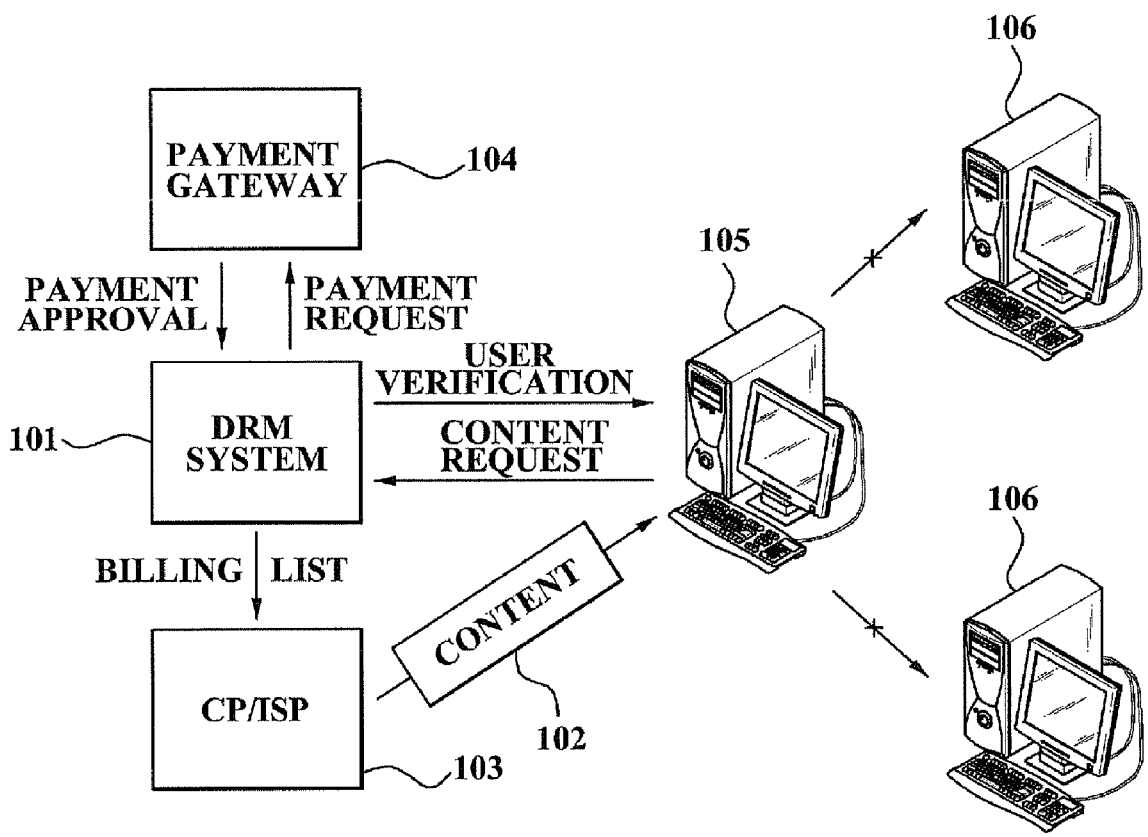
FIG. 1 is a schematic diagram illustrating a method of performing DRM according to a conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
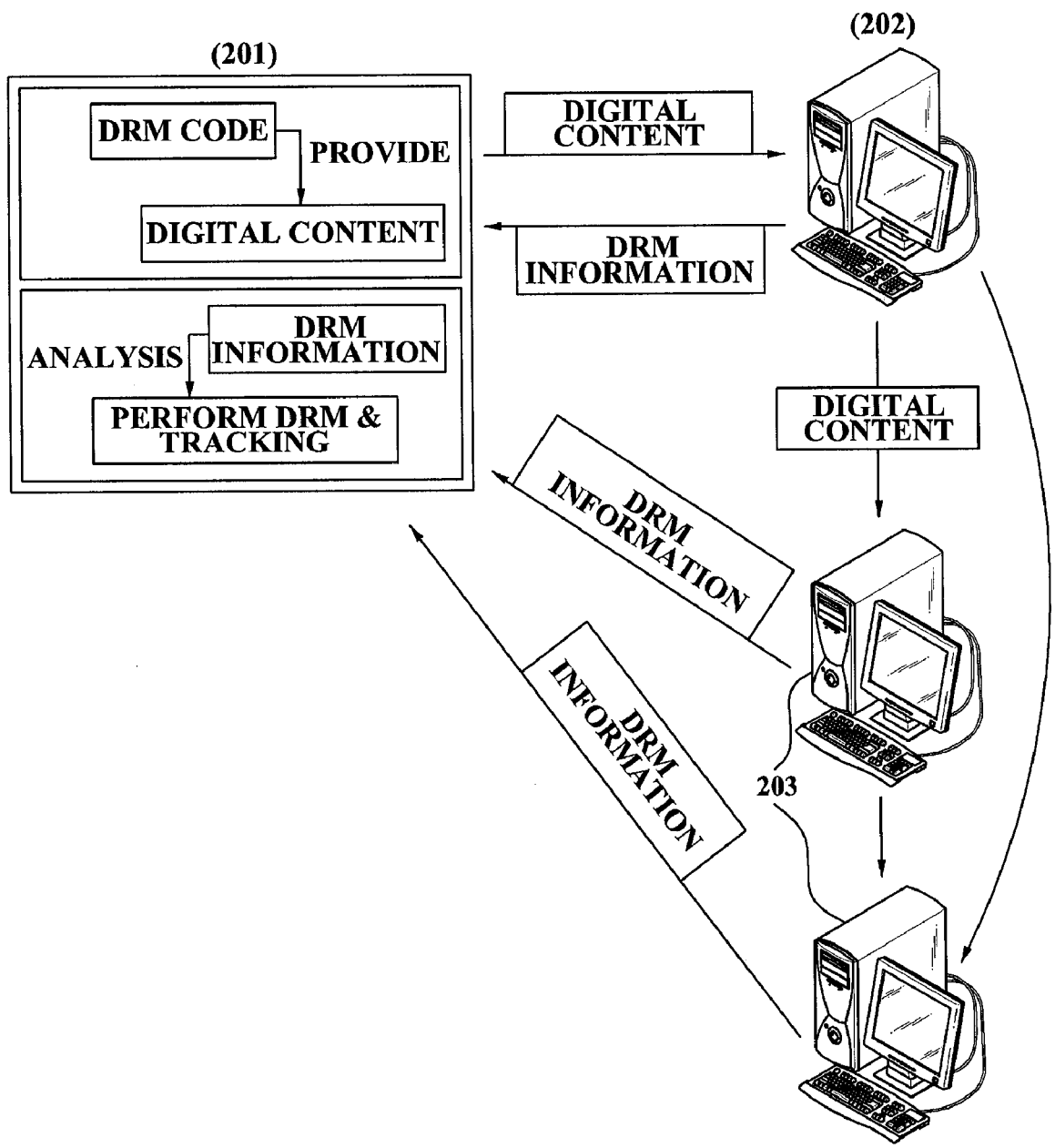
FIG. 2 is a schematic diagram illustrating a method of performing DRM and tracking with respect to a digital content according to a first embodiment of the present invention.

FIG. 2 is a schematic diagram illustrating a method of performing Digital Rights Management (DRM) and tracking with respect to a digital content according to a first embodiment of the present invention.

As shown in FIG. 2, a DRM system 201 provides a DRM code with a virus characteristic in the digital content. When a terminal 202 downloads the digital content from the DRM system 201, and plays the digital content, the DRM code operates to generate DRM information associated with the digital content and transmit the generated DRM information to the DRM system 201.

In this case, when other terminals 203 download the digital content from the terminal 202 and play the digital content, the DRM code also operates to generate the DRM information and transmit the generated DRM information to the DRM system 201.

In this instance, the DRM system 201 analyzes the transmitted DRM information and performs DRM and tracking with respect to the digital content.

The method of performing DRM and tracking with respect to the digital content has been briefly described above with reference to FIG. 2, and hereinafter, will be described in detail with reference to FIGS. 3 through 8.

Figure 3:
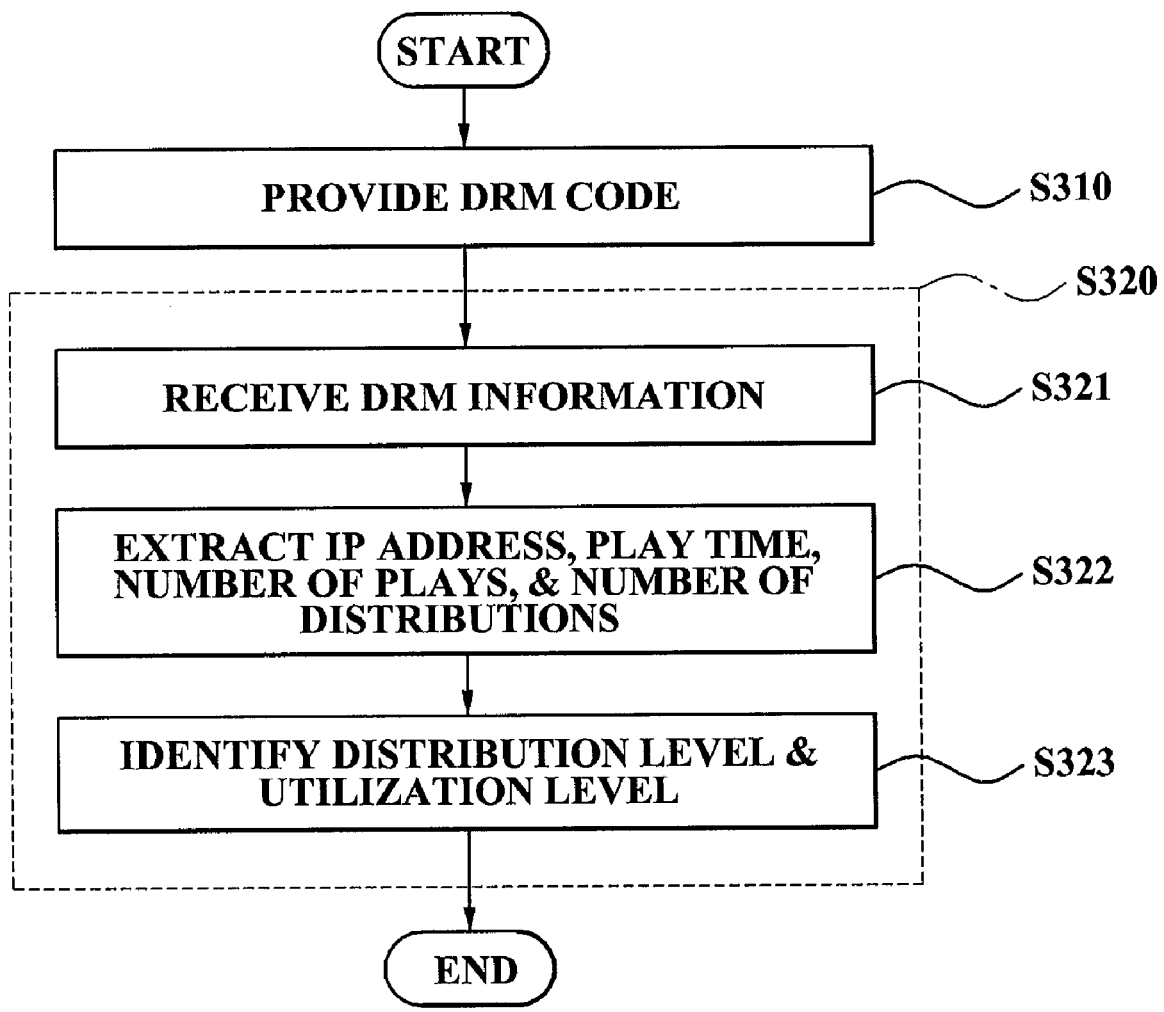
FIG. 3 is a flowchart illustrating a method of performing DRM and tracking with respect to a digital content according to the first embodiment.

FIG. 3 is a flowchart illustrating a method of performing DRM and tracking with respect to a digital content according to the first embodiment.

In operation S310, a DRM system provides a DRM code including a virus characteristic, in the digital content. In this instance, the DRM code may privately perform a DRM function when the digital content is played by using the virus characteristic. The virus characteristic is provided in another program and privately performs a function.

Also, operation S310 may include operations of providing an advertisement tag in the digital content, wherein the advertisement tag includes either the virus characteristic or an IRCBot characteristic; and providing an advertisement associated with an advertisement request to a terminal when the advertisement request is transmitted from the DRM system to the terminal via the advertisement tag, wherein the terminal downloads the digital content.

As described above, the digital content may include various types of references and information which can manufacture, process, and distribute, codes, characters, voice, sound, images, videos, and the like, using a digital scheme in the Internet or a communication network. Particularly, in the present embodiment, the digital content may include moving pictures, music contents, and advertisements, requiring DRM or tracking.

When the DRM code is arbitrarily deleted from the digital content, the digital content may be automatically terminated. Specifically, a function of restricting an intentional deletion of the DRM code to prevent the DRM and tracking may be added.

The virus characteristic includes a computer virus characteristic. Operational principles of a computer virus are as follows:

1) The computer virus is processed prior to a normal program. Specifically, the computer virus is placed at the back of the program and performs a function of skipping over an initial command word of the program to the computer virus. Accordingly, when the program infected with the computer virus is executed, the computer virus is executed and thereby infects other programs, and then the original program is executed.

In this instance, a user may not detect any abnormality or may just think a processing speed of a terminal is slightly diminished. Consequently, in many cases, users realize the computer virus only after a destructive routine is executed.

2) The computer virus hides a virus code in a memory region. Specifically, the computer virus inspects a region which the program barely utilizes, such as a buffer region, a stack region, and the like, and locates the virus code in the region. In this instance, the entire length of the program does not change. Also, the computer virus may generate a 'Stealth' file on a disc to infect even other programs which utilize many regions, and then put only a routine, indicating the file, in the program.

3) The computer virus operates while being hidden in normal programs. Also, the computer virus may be hidden in a predetermined program which is programmed to spread the computer virus, such as a Trojan horse program. In this instance, the program may be a game program, a useful utility program, a new version of a commercial program, fake news for computer users, and the like.

As described above, the DRM code privately performs a function of generating the DRM information associated with the digital content, and a function of transmitting the DRM information to the DRM system, based on the virus characteristic. Accordingly, by providing the DRM code in the digital content, there is minimal change in the file size and quality of the digital content. Also, the digital content may be playable in a universal player regardless of the DRM code and thus DRM and tracking may be performed independently from the universal player.

In operation S320, the DRM system performs the DRM and tracking with respect to the digital content, based on DRM information. In this instance, the DRM information is generated based on the DRM code. Also, operation S320 may include operations S321 through S323. Also, when a unique identifier is assigned to the DRM code and thereby the digital content is re-distributed from the terminal to a plurality of other terminals, the DRM system may identify the re-distribution of the DRM information inputted from each of the plurality of terminals by using the unique identifier, and restrict a distribution greater than or equal to a predetermined value.

In operation S321, the DRM system receives the DRM information from a terminal which downloads the digital content. In this instance, the DRM information corresponds to information generated by the DRM code, and may include an Internet Protocol (IP) address of the terminal, a play time of the digital content, a number of plays thereof, and a number of distributions thereof.

When a user of the terminal downloads the digital content, the DRM system provides the user with matters regarding the DRM code included in the digital content and the DRM information, and requests the user's consent. When the user consents, the DRM system may enable the user to download the digital content.

In operation S322, the DRM system extracts the IP address, the play time, the number of plays, and the number of distributions from the DRM information. In this instance, the number of distributions may include a number of terminals that download the digital content.

In operation S323, the DRM system identifies a distribution level and a utilization level of the digital content by analyzing the extracted IP address, the play time, the number of plays, and the number of distributions. Specifically, the DRM system may verify where and how frequently the digital content has been played. Also, the DRM system may include a play part of the digital content in the DRM information and thereby obtain statistical reference about a widely utilized play part of the content.

As described above, the digital content may include a moving picture, a music content, or an advertisement, requiring DRM or tracking. The DRM code with the virus characteristic is provided in the digital content. When the digital content is played, DRM information associated with the digital content is generated from the DRM code and then transmitted to the DRM system. Accordingly, the DRM system may verify the distribution level and the utilization level of the digital content based on the DRM information, and perform DRM and tracking with respect to the digital content.

Figure 4:
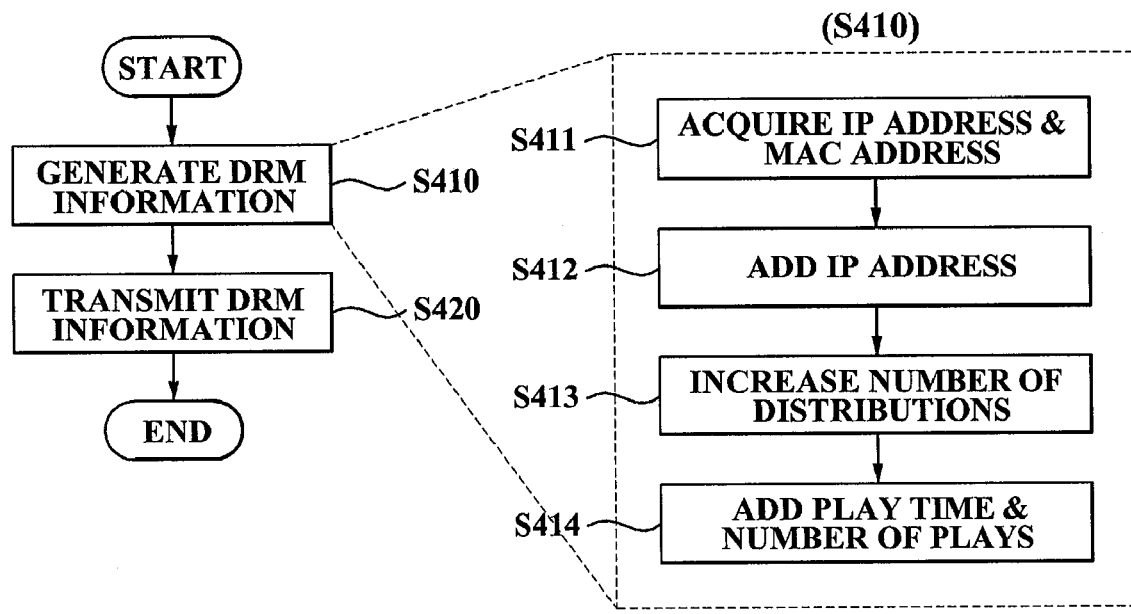
FIG. 4 is a flowchart illustrating a method of performing a DRM function by a DRM code according to a second embodiment of the present invention.

FIG. 4 is a flowchart illustrating a method of performing a DRM function by a DRM code according to a second embodiment of the present invention.

As described above, when the digital content is played, the DRM code having the virus characteristic performs the DRM function included in the DRM code. In this instance, the DRM function may include a function of generating the DRM information and a function of transmitting the DRM information to the DRM system.

Hereinafter, the function of generating the DRM information will be described using operations S410 and S411 through S414, and the function of transmitting the DRM information to the DRM system will be described using operation S420. In this instance, operations S411 through S414 may be included in operations S410.

In operation S410, when a digital content is played, the DRM code generates DRM information associated with the digital content. In this instance, the DRM code may perform a DRM function when the digital content is played using a virus characteristic. The virus characteristic is provided in another program and privately performs a function.

Also, operation S410 may include an operation of restricting play of the digital content by identifying a unique serial number of a portable digital device and the re-distribution of the digital content based on the unique serial number when the terminal is the portable digital device. The operation of restricting may include an operation of preventing playback of the content when information transmission to the DRM system is impossible.

Specifically, by identifying the unique serial number of the portable digital device, it is possible to recognize that the terminal is the portable digital device, and restrict play of the digital content. Also, only when the portable digital device may not transmit information to the DRM system, play of the digital content may be prevented.

When an advertisement tag having the virus characteristic or an IRCBot characteristic is included in the digital content, the DRM code may further include an operation of transmitting an advertisement request, requesting a real-time advertisement, to an advertisement server or a DRM server associated with the advertisement tag.

In operation S411, the DRM code acquires the IP address and a Media Access Control (MAC) address of the terminal. In this instance, the IP address may be utilized to analyze where the digital content is played. Also, the MAC address may be utilized to restrict the distribution level of the digital content.

In operation S412, the DRM code adds the IP address to the DRM information.

In operation S413, the DRM code increases the number of distributions by verifying whether the digital content is re-distributed via the MAC address. A method of increasing the number of distributions will be described in detail with reference to FIG. 5.

In operation S414, the DRM code acquires and adds the play time and the number of plays to the DRM information. In this instance, the play time and the number of plays may be utilized to analyze how frequently the digital content was played. Also, when information about a played part of the digital content is additionally included in the DRM information, it may be utilized to verify which part of the digital content many users frequently utilized. Also, when an advertisement is provided in the digital content, the DRM information may be utilized to determine in which part of the digital content the advertisement must be provided. The advertisement will be described in detail with reference to FIG. 7.

In operation S420, the DRM code transmits the DRM information to the DRM system associated with the digital content. In this instance, operation S420 may include operations of verifying a connection between the terminal and a network, and transmitting the DRM information using URL information associated with the DRM system when the connection is verified. In this instance, the URL information is included in the DRM code.

Figure 5:
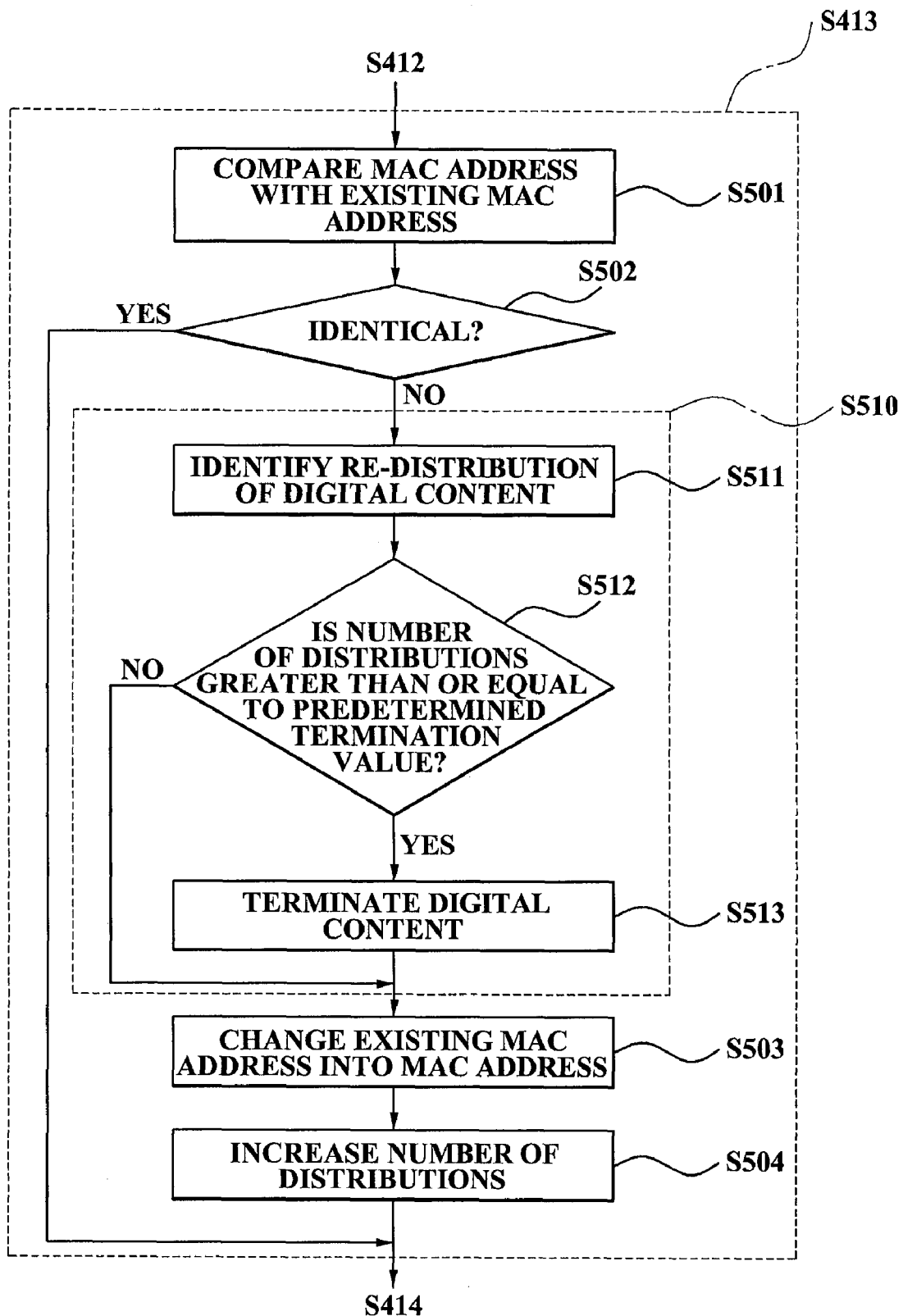
FIG. 5 is a flowchart illustrating a method of increasing a number of distributions according to the second embodiment.

FIG. 5 is a flowchart illustrating a method of increasing a number of distributions according to the second embodiment.

In operation S501, the DRM code compares the MAC address with an existing MAC address which is included in the DRM information.

The DRM code performs operation S414 when the MAC address is identical to the existing MAC address in operation S502, and performs operation S503 when the MAC address is different from the existing MAC address in operation S502. In this instance, operation S510 may be additionally performed between operations S502 and S503.

In operation S503, the DRM code changes the existing MAC address into the MAC address when the MAC address is different from the existing MAC address.

In operation S504, the DRM code increases a counter of the number of distributions included in the DRM information. In this instance, the number of distributions may include a number of terminals which download the digital content.

In operation S510, the DRM code may perform operations S511 through S513 when a predetermined termination value is included in the DRM code and the number of distributions is at least two.

In operation S511, the DRM code identifies that the digital content is re-distributed when the MAC address is different from the existing MAC address.

When the number of distributions is greater than or equal to the termination value in operation S512, the DRM code performs operation S513. Conversely, when the number of distributions is less than the termination value in operation S512, the DRM code performs operation S503.

In operation S513, the DRM code terminates the digital content when the number of distributions is greater than or equal to the termination value.

As described above, the termination value is included in the DRM code and thus the distribution level of the digital content may be controlled even before distribution of the digital content based on the termination value. Accordingly, when the digital content is re-distributed, it is possible to identify another user of the digital content as a different user, and transmit a notice, indicating that the digital content has copyrights reserved, and the DRM information to the DRM system, so that the DRM system may provide the other user with corresponding matters, acquire the other user's consent, and then enable the other user to play the digital content.

Figure 6:
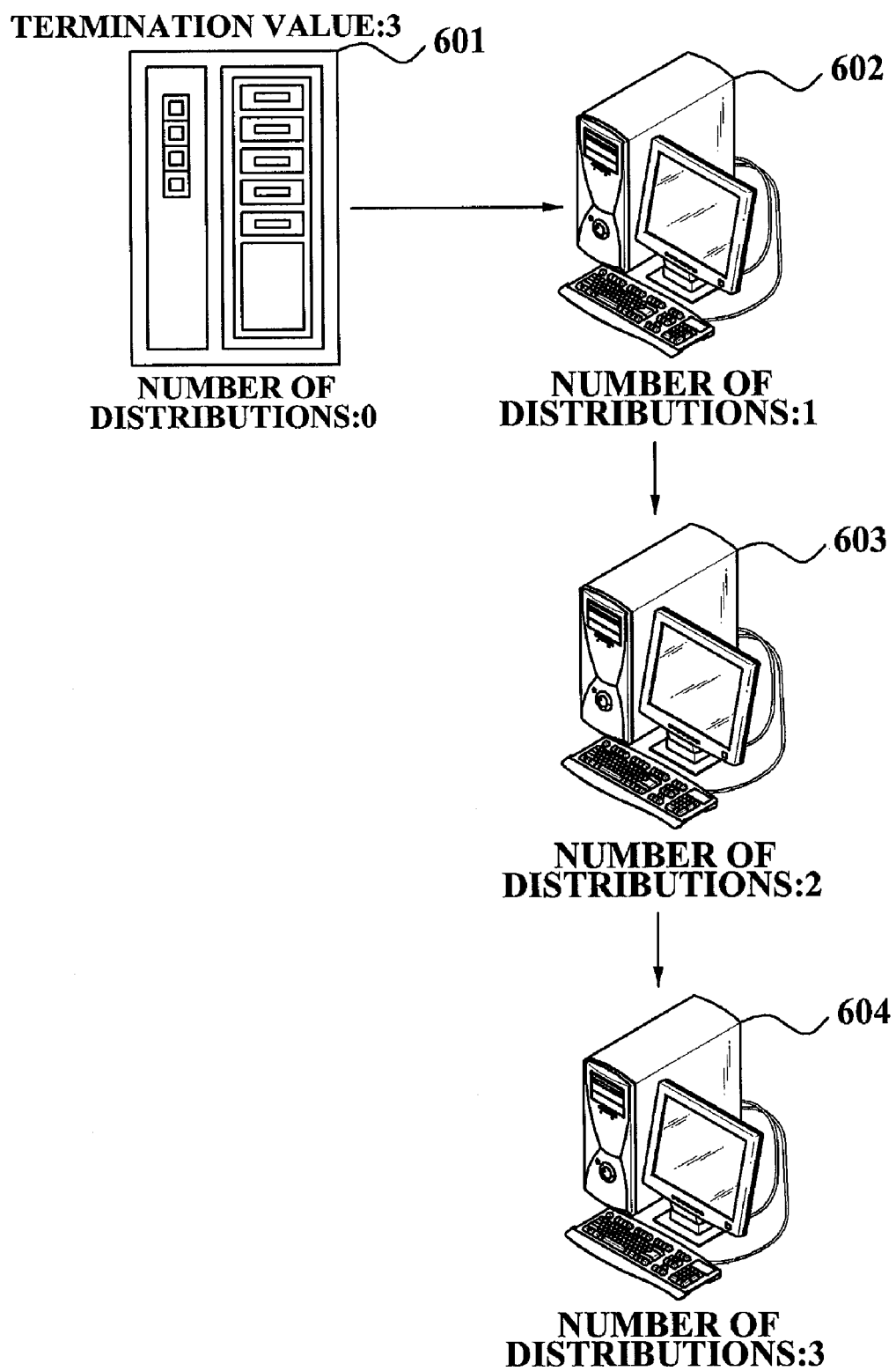
FIG. 6 illustrates an example of a method of terminating a digital content.

FIG. 6 illustrates an example of a method of terminating a digital content.

A DRM system 601 may include a predetermined termination value in a DRM code that is provided in a digital content.

Hereinafter, a method of terminating a digital content when the termination value is set to '3' will be described with reference to FIG. 6.

In this instance, the DRM code includes a counter to count a number of distributions, including a number of terminals that download the digital content. When the digital content is not downloaded, the number of distributions has a value of '0'.

When the digital content is downloaded to a first terminal 602, and played in the first terminal 602, the DRM code compares a first MAC address of the first terminal 602 and an existing MAC address, included in the DRM code, as described above with reference to operations S501 through S504 of FIG. 5.

In this instance, the existing MAC address may include a predetermined default value. As a result of the comparison, the first MAC address is different from the existing MAC address, and thus the existing MAC address is changed into the first MAC address, and the counter of the number of distributions, included in the DRM information, is increased to '1'. In this case, the number of distributions is not included in the at least two distributions, described above with FIG. 5, and thus operation S510 of terminating the digital content is not performed.

Also, even in a second terminal 603 that downloads the digital content from the first terminal 602, a second MAC address of the second terminal 603 is different from the existing MAC address which is changed into the first MAC address. Accordingly, the existing MAC address is changed into the second MAC address, and the counter of the number of distributions is increased to '2'.

In this case, since the DRM code includes the termination value and the number of distributions is included in the at least two distributions, operation S510 is performed. However, as shown in operation S512, the number of distributions is less than the termination value and thus the digital content is not terminated.

Also, even in a third terminal 604 that downloads the digital content from the second terminal 603, a third MAC address of the third terminal 604 is different from the existing MAC address which is changed into the second MAC address. Accordingly, the existing MAC address is changed into the third MAC address, and the counter of the number of distributions is increased to '3'.

In this case, since the number of distributions is greater than or equal to the termination value in the third terminal 604, the digital content is terminated through operation S510, and thus the third terminal 604 may not play the digital content.

When the termination value is '2', the digital content of the first terminal 602 may be downloaded and playable in other terminals. Conversely, the digital content, included in the other terminals excluding the first terminal 602, may be downloaded in the other terminals and unplayable.

The method of terminating the digital content, described above with reference to FIG. 6, is only an example of embodiments of the present invention, and the present invention is not limited thereto. Thus, it will be apparent to those of ordinary skills in the art that various types of changes and modifications may be made without departing from the spirit of the invention.

Figure 7:
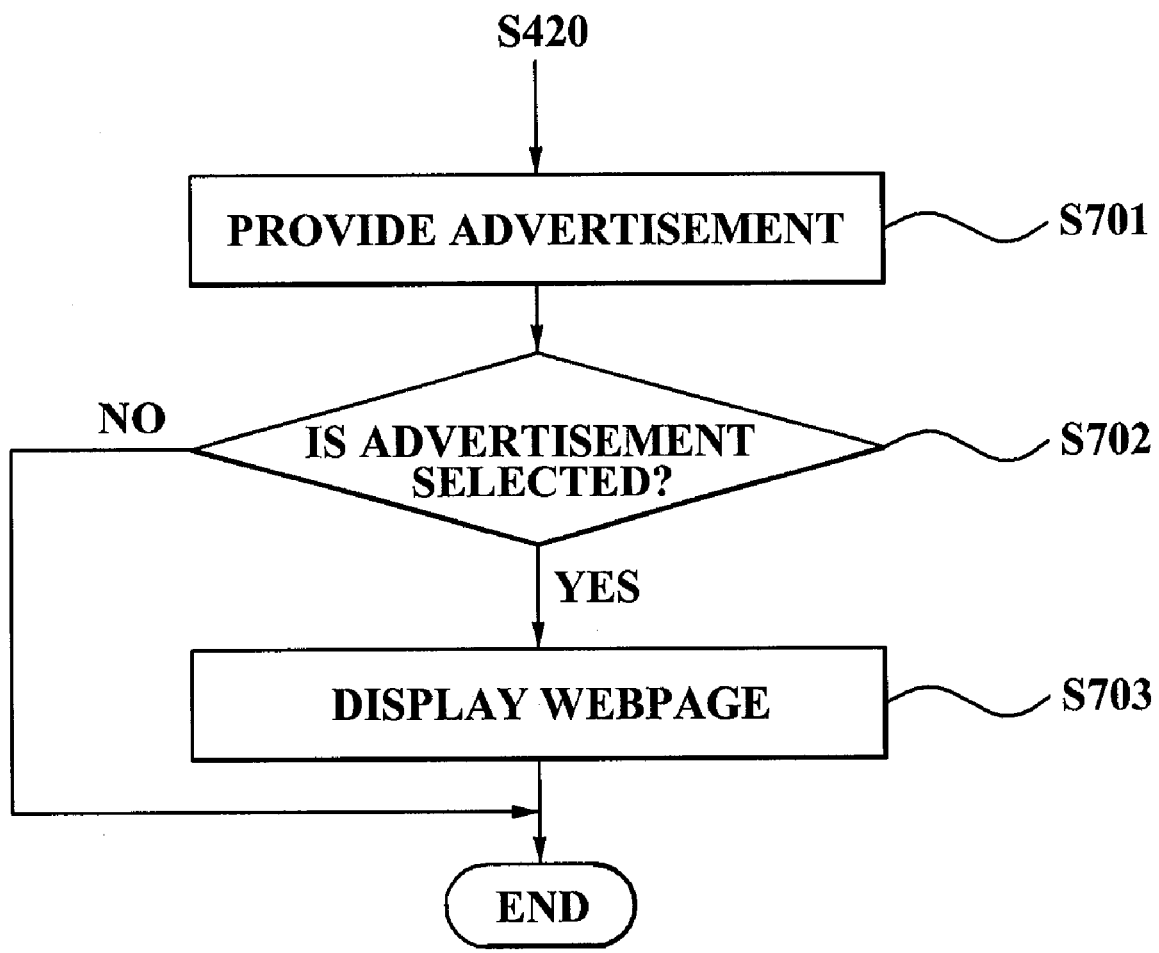
FIG. 7 is a flowchart illustrating a method of providing an advertisement according to the second embodiment.

FIG. 7 is a flowchart illustrating a method of providing an advertisement according to the second embodiment. In this instance, when the digital content includes the advertisement, the method may be further included and performed after operation S420 of FIG. 4. Also, the advertisement may include a streaming advertisement, a still picture advertisement, or a rich media content.

In operation S701, when the DRM code includes a layer or a script providing an advertisement to the digital content, the DRM code provides the advertisement. In this case, the DRM code may be provided in various types of locations such as an initial portion, a middle portion, and an end portion of the digital content. Also, the layer or the script may be provided in another part of the digital content, instead of the DRM code.

The DRM code performs operation S703 when the advertisement is selected in operation S702, and terminates operations when the advertisement is not selected in operation S702. In this instance, selecting of the advertisement may include a terminal user's click on the advertisement via a mouse.

In operation S703, when the advertisement is selected, the DRM code displays a webpage of a Universal Resource Locator (URL) associated with the advertisement via an application of the terminal and a network. In this case, the URL may be included in the digital content with the advertisement, or may be included in the digital content with the DRM code.

As described above, when the advertisement is provided in the digital content with the DRM code or when the digital content is the advertisement, it is possible to enable an advertiser to track the advertisement and thereby readily utilize information to measure advertising effect about the advertisement.

Also, a digital content provider may arbitrarily provide an advertisement in a digital content and then distribute the digital content. Accordingly, copyrights and advertisement revenues may be shared and thus a user of the digital content may freely utilize a paid for content.

Figure 8:
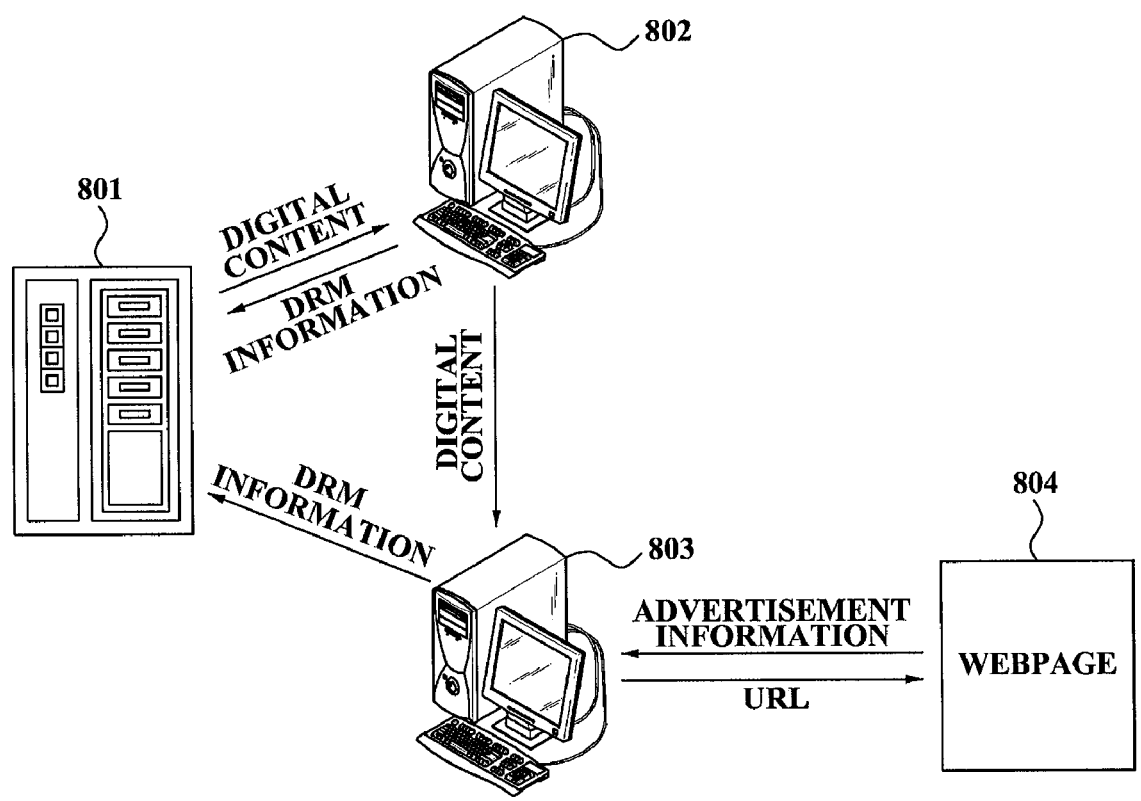
FIG. 8 illustrates an example of a method of tracking a secondary distribution of a digital content and a method of displaying a webpage associated with an advertisement on a terminal.

FIG. 8 illustrates an example of a method of tracking a secondary distribution of a digital content and a method of displaying a webpage associated with an advertisement on a terminal.

When a DRM system 801 provides a DRM code with a virus characteristic in a digital content, and a first terminal 802 downloads the digital content and plays the digital content, the DRM code generates DRM information and transmits the generated DRM information to the DRM system 801. In this instance, the DRM information includes an IP address of the first terminal 802, a number of plays of the digital content, a play time thereof, a number of distributions thereof, and the like.

A second terminal 803 downloads the digital content from the first terminal 802. Accordingly, even in the case of the secondary distribution of the digital content, when the second terminal 803 plays the digital content, the DRM code generates DRM information and transmits the generated DRM information to the DRM system 801. Also, the DRM information includes an IP address of the second terminal 803, a number of plays of the digital content, a play time thereof, a number of distributions thereof, and the like.

As described above, the DRM system 801 may perform tracking with respect to a distribution level of the digital content based on the DRM information transmitted from the first terminal 802 and the second terminal 803. Through this, the DRM system 801 may perform DRM.

In addition to the secondary distribution of the digital content, even in the case of an $N^{th}$ distribution of the digital content, the DRM system 801 may perform tracking and DRM with respect to the digital content through the same method.

Also, as described above with reference to FIG. 7, the DRM code of the digital content may include a layer or a script which provides an advertisement in the digital content. Also, the layer or the script may be provided in a particular part of the digital content, instead of the DRM code.

In this case, while the digital content is being played or while a portion of the digital content is being played, the DRM code provides the advertisement to the first terminal 802 and the second terminal 803.

As an example, as shown in FIG. 8, when the advertisement is selected, the DRM code displays a webpage 804 of a URL associated with the advertiser through an application of the second terminal 803 and a network.

The method of tracking a secondary distribution of a digital content and the method of displaying a webpage associated with an advertisement on a terminal are only examples of exemplary embodiments of the present invention, and the present invention is not limited thereto. Accordingly, it will be apparent to those of ordinary skills in the art that various types of modifications and changes may be made without departing from the invention.

Figure 9:
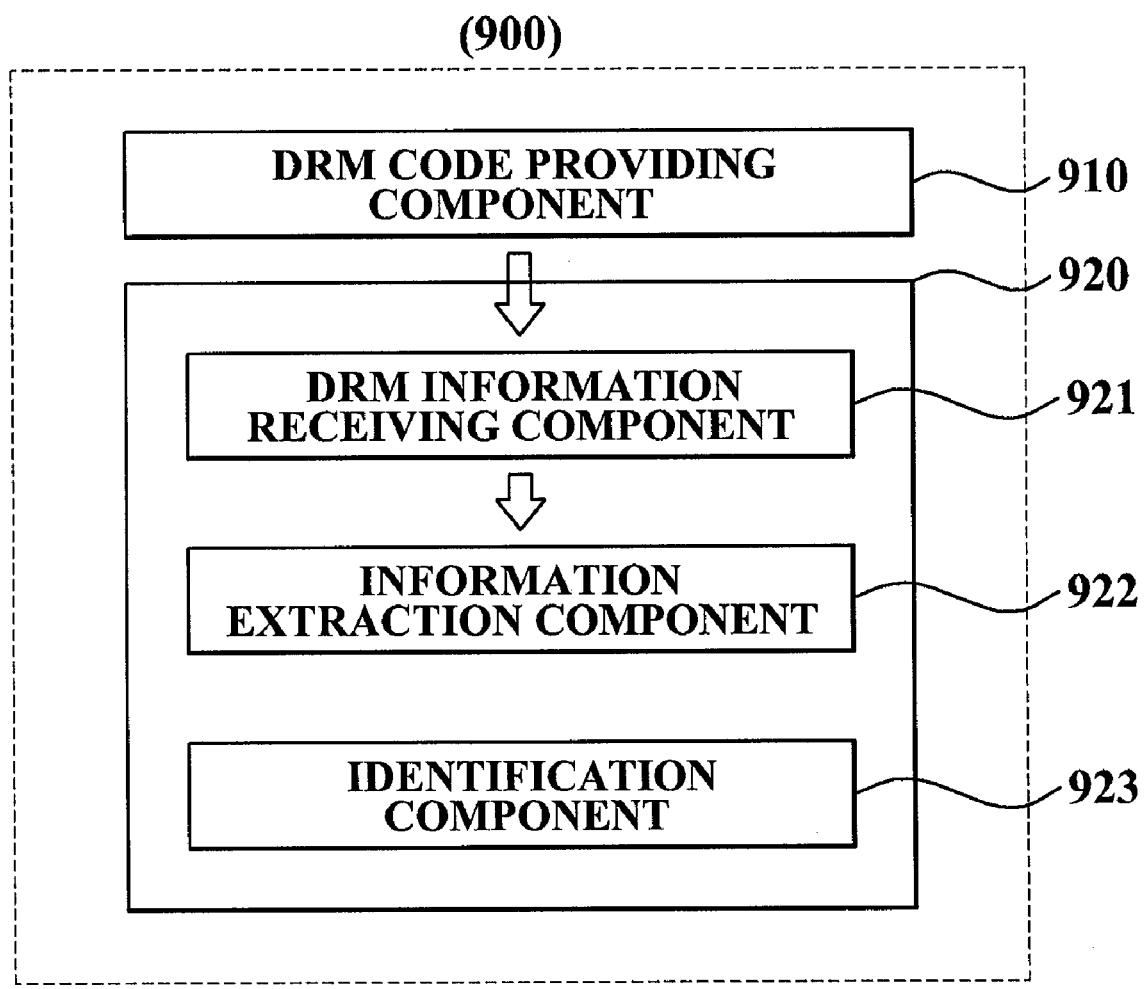
FIG. 9 is a block diagram illustrating an internal configuration of a DRM system performing DRM and tracking with respect to a digital content according to a third embodiment of the present invention.

FIG. 9 is a block diagram illustrating an internal configuration of a DRM system 900 performing DRM and tracking with respect to a digital content according to a third embodiment of the present invention. As shown in FIG. 9, the DRM system 900 may include a DRM code providing component 910 and a DRM and tracking performing component 920.

The DRM code providing component 910 provides a DRM code to the digital content in a DRM system. In this instance, DRM code includes a virus characteristic. Also, the DRM code may performs a DRM function when the digital content is played using the virus characteristic which is provided in another program and privately performs a function.

The DRM and tracking performing component 920 performs the DRM and tracking with respect to the digital content, based on DRM information which is generated based on the DRM code. In this instance, the DRM and tracking performing component 920 may include a DRM information receiving component 921, an information extraction component 922, and an identification component 923. Also, the DRM function may include a function of generating the DRM information associated with the digital content, and a function of transmitting the DRM information to the DRM system.

The DRM information receiving component 921 receives the DRM information from a terminal which downloads the digital content. In this instance, the DRM information includes an IP address, a play time of the digital content, a number of plays thereof, and a number of distributions thereof.

The information extraction component 922 extracts the IP address, the play time, the number of plays, and the number of distributions from the DRM information.

The identification component 923 identifies a distribution level and a utilization level of the digital content by analyzing the extracted IP address, the play time, the number of plays, and the number of distributions.

As described above, when a DRM code having a virus characteristic is provided in a digital content, and the digital content is played, DRM information associated with the digital content may be generated from the DRM code, and then transmitted to a DRM system. Accordingly, the DRM system may verify a distribution level and a utilization level of the digital content based on the DRM information, and perform DRM and tracking with respect to the digital content.

Figure 10:
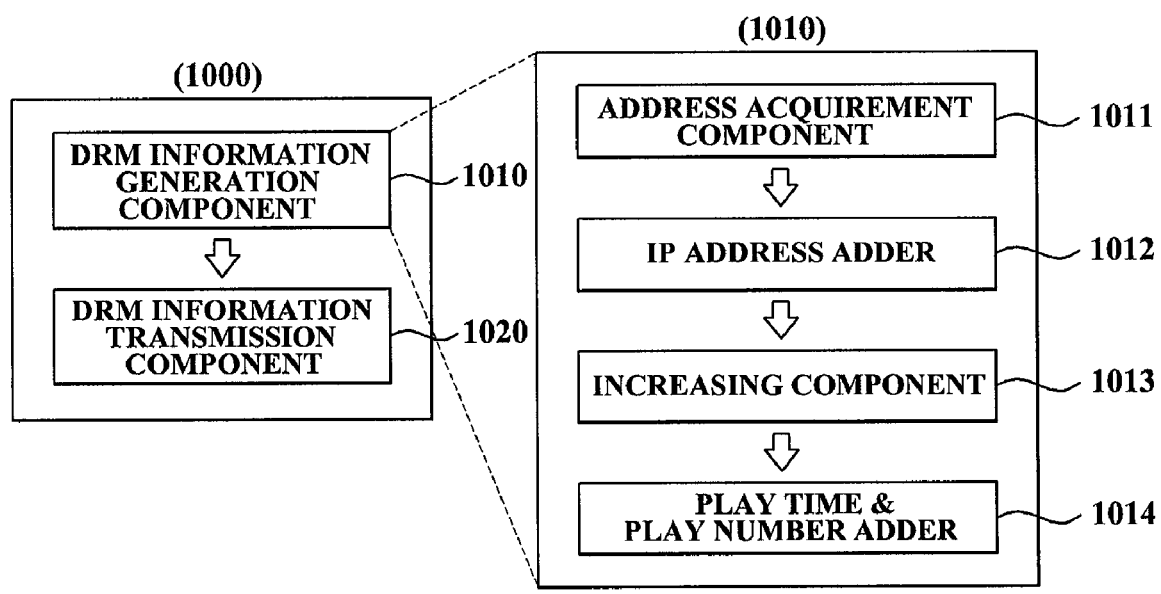
FIG. 10 is a block diagram illustrating an internal configuration of a DRM code execution system according to a fourth embodiment of the present invention.

FIG. 10 is a block diagram illustrating an internal configuration of a DRM code execution system 1000 according to a fourth embodiment of the present invention. As shown in FIG. 10, the DRM code execution system 1000 may include a DRM information generation component 1010 and a DRM information transmission component 1020.

The DRM information generation component 1010 generates DRM information associated with a digital content when the digital content is played. In this case, the DRM information generation component 1010 may include an address acquirement component 1011, an IP address adder 1012, an increasing component 1013, and a play time and play number adder 1014. Also, the DRM information may include an IP address, a play time of the digital content, a number of plays thereof, and a number of distributions thereof.

The address acquirement component 1011 acquires the IP address and a MAC address of the terminal.

The IP address adder 1012 adds the IP address to the DRM information.

The increasing component 1013 increases the number of distributions by verifying, via the MAC address, whether the digital content is re-distributed. In this case, the number of distributions may include a number of terminals downloading the digital content. The increasing component 1013 will be described in detail with reference to FIG. 11.

The play time and play number adder 1014 acquires and adds the play time and the number of plays to the DRM information.

The DRM information transmission component 1020 transmits the DRM information to a DRM system associated with the digital content. As described above with reference to FIG. 9, the DRM information may be utilized to perform DRM and tracking with respect to the digital content. As an example, in this instance, the IP address may be utilized to analyze where the digital content was played, and the MAC address may be utilized to restrict the distribution level of the digital content.

Figure 11:
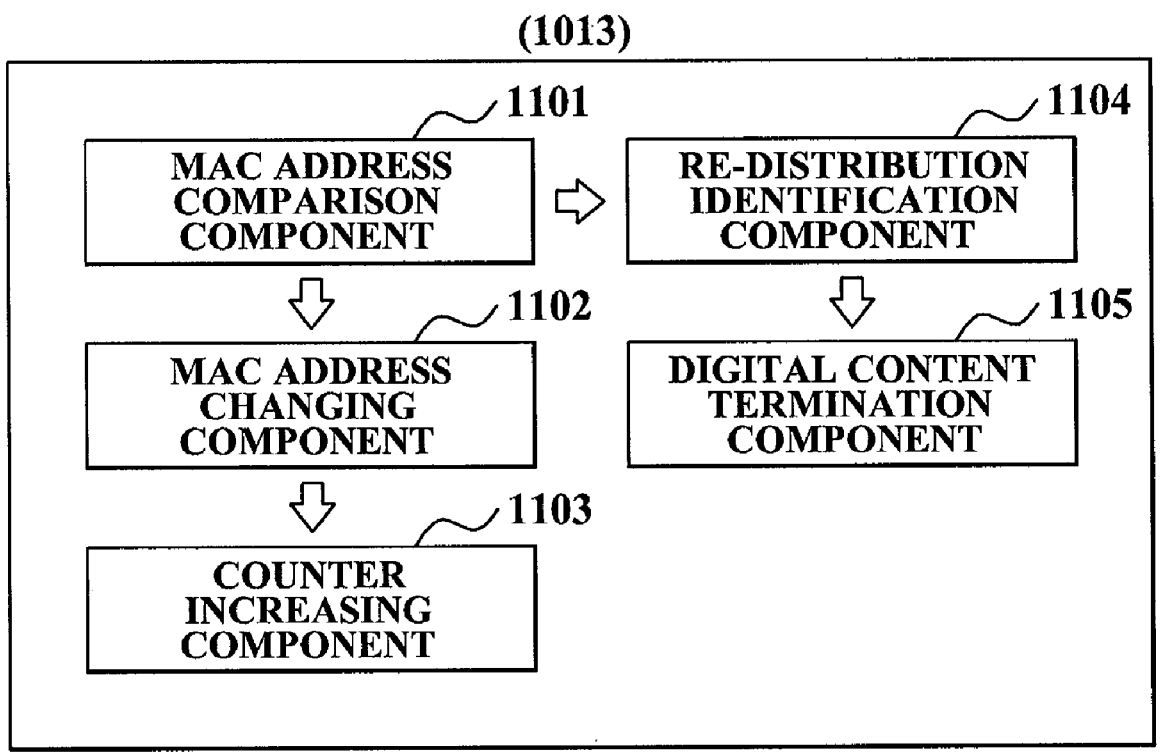
FIG. 11 is a block diagram illustrating an internal configuration of a distribution number adder according to the fourth embodiment.

FIG. 11 is a block diagram illustrating an internal configuration of the increasing component 1013 according to the fourth embodiment. As shown in FIG. 11, the increasing component 1013 may include a MAC address comparison component 1101, a MAC address changing component 1102, and a counter increasing component 1103. Also, when the termination value is set in the DRM code, the increasing component 1013 may further include a re-distribution identification component 1104 and a digital content termination component 1105.

The MAC address comparison component 1101 compares the MAC address with an existing MAC address which is included in the DRM information The MAC address changing component 1102 changes the existing MAC address into the MAC address when the MAC address is different from the existing MAC address.

The counter increasing component 1103 increases a counter of the number of distributions which is included in the DRM information.

The re-distribution identification component 1104 identifies that the digital content is re-distributed when the MAC address is different from the existing MAC address. In this case, play of the digital content may be immediately prevented from being played through the identification of the re-distribution. Also, play of the digital content may be restricted in a state where re-distributions corresponding to the termination value are allowed via the digital content termination component 1105.

The digital content termination component 1105 terminates the digital content when the number of distributions is greater than or equal to a termination value.

As described above, the termination value is included in the DRM code. Accordingly, it is possible to control the distribution level of the digital content even before distribution of the digital content using the termination value.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

According to the present invention, it is possible to identify a distribution level and utilization level of a digital content based on DRM information, and also perform DRM and tracking by providing a DRM code in the digital content, generating the DRM information associated with the digital content from the DRM code when the digital content is played, and transmitting the generated DRM information to a DRM system. In this instance, the DRM code includes a virus characteristic.

Also, according to the present invention, it is possible to perform DRM and tracking with respect to a digital content, independently from a universal player, since there is minimal change in file size and quality of the digital content, and also the digital content is playable in the universal player regardless of whether the DRM code is included.

Also, according to the present invention, it is possible to enable an advertiser to track an advertisement and thereby readily utilize information to measure advertising effect of about the advertisement when the advertisement is provided in the digital content with a DRM code or when the digital content corresponds to the advertisement.

Also, according to the present invention, a digital content provider may arbitrarily provide an advertisement in a digital content and then distribute the digital content. Accordingly, copyrights and advertisement revenues may be shared and thus a user of the digital content may freely utilize a paid for content.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of performing Digital Rights Management (DRM) and tracking with respect to a digital content, the method comprising associating a DRM code with a digital content, the DRM code comprising a computer virus characteristic comprising the DRM code is being hidden in a memory; performing DRM by executing the DRM code prior to performing the digital content in a user terminal such that the DRM authorizes or prohibits the performance of the digital content in the user terminal based, at least in part, upon DRM information generated by the DRM code; and tracking with respect to the digital content based on the DRM information, wherein the DRM information is updated in accordance with activities with respect to the digital content wherein the DRM code performs a DRM function when the digital content is played using the computer virus characteristic, and the computer virus characteristic is provided in another program and privately performs a function, wherein the DRM information comprises an Internet Protocol (IP) address, a play time of the digital content, a number of plays thereof, and a number of distributions thereof, wherein a distribution level and a utilization level of the digital content are identified by analyzing the IP address, the play time, the number of plays, and the number of distributions, and wherein the play or the distribution of the digital content is restricted based on the identified distribution level and utilization level.

2. The method of claim 1, wherein the DRM function comprises a function of generating the DRM information associated with the digital content, and a function of transmitting the DRM information to the DRM system.

3. The method of claim 1, wherein
the performing DRM by executing the DRM code comprises:
receiving the DRM information from a user terminal which downloads the digital content;
extracting the IP address, the play time, the number of plays, and the number of distributions from the DRM information.

4. The method of claim 3, wherein, when a unique identifier is assigned to the DRM code and thereby the digital content is re-distributed from the terminal to a plurality of other terminals, the DRM system identifies the re-distribution of the DRM information inputted from each of the plurality of terminals by using the unique identifier, and restricts a distribution greater than or equal to a predetermined value.

5. The method of claim 3, wherein the number of distributions comprises a number of user terminals which download the digital content.

6. The method of claim 1, wherein the associating the DRM code comprises:
providing an advertisement tag in the digital content, wherein the advertisement tag comprises either the virus characteristic or an IRCBot characteristic; and
providing an advertisement associated with an advertisement request to a terminal when the advertisement request is transmitted from the DRM system to the terminal via the advertisement tag, wherein the terminal downloads the digital content.

7. The method of claim 1, wherein the digital content comprises a text, an image, a moving picture, a music content, and an advertisement, requiring the DRM and tracking, and
the digital content is terminated when the DRM code is arbitrarily deleted from the digital content.

8. A method of performing a Digital Rights Management (DRM) function by a DRM code, the method: generating DRM information associated with a digital content when the digital content is played; tracking with respect to the digital content based on the DRM information, wherein the DRM information is updated in accordance with activities with respect to the digital content; and transmitting the DRM information to a DRM system associated with the digital content wherein the DRM code performs the DRM function when the digital content is played using a virus characteristic which is provided in another program and which privately performs a function, wherein the DRM information comprises an IP address, a play time of the digital content, a number of plays thereof, and a number of distributions thereof, wherein a distribution level and a utilization level of the digital content are identified by analyzing the IP address, the play time, the number of plays, and the number of distributions, and wherein the play or the distribution of the digital content is restricted based on the identified distribution level and utilization level.

9. The method of claim 8, wherein
the generating DRM information comprises:
acquiring the IP address and a Media Access Control (MAC) address of the terminal;
adding the IP address to the DRM information;
increasing the number of distributions by verifying whether the digital content is re-distributed via the MAC address;
and acquiring and adding the play time and the number of plays to the DRM information.

10. The method of claim 9, wherein the number of distributions comprises a number of terminals which download the digital content, and
the increasing comprises:
comparing the MAC address with an existing MAC address which is included in the DRM information;
changing the existing MAC address into the MAC address when the MAC address is different from the existing MAC address; and
increasing a counter of the number of distributions which is included in the DRM information.

11. The method of claim 10, further comprising:
identifying that the digital content is re-distributed when the MAC address is different from the existing MAC address; and
terminating the digital content when the number of distributions is greater than or equal to a predetermined termination value.

12. The method of claim 8, wherein the generating DRM information comprises:
restricting play of the digital content by identifying a unique serial number of a portable digital device and the re-distribution of the digital content based on the unique serial number when the terminal is the portable digital device.

13. The method of claim 12, wherein the restricting comprises:
restricting play of the content when information transmission to the DRM system is impossible.

14. The method of claim 8, wherein the generating further comprises:
transmitting an advertisement request, requesting a real-time advertisement, to an advertisement server or a DRM server associated with an advertisement tag when the advertisement tag exists in the digital content, wherein the advertisement tag comprises a virus characteristic or an IRCBot characteristic.

15. The method of claim 8, wherein the DRM code is provided in various locations that comprise an initial portion, a middle portion, and an end portion of the digital content, and
the method further comprises:

providing an advertisement when the DRM code comprises a layer or a script providing the advertisement to the digital content; and providing a webpage of a Universal Resource Locator (URL) associated with the advertisement via an application of the terminal and a network when the advertisement is selected.

16. The method of claim 15, wherein the advertisement comprises a streaming advertisement, a still picture advertisement, or a rich media content.

17. The method of claim 8, wherein the transmitting comprises:

verifying a connection between the terminal and a network; and transmitting the DRM information using URL information associated with the DRM system when the connection is verified, wherein the URL information is included in the DRM code.

18. At least one non-transitory computer-readable storage medium having stored thereon a computer program that, when executed by one or more processors, causes the one or more processors to perform acts comprising: associating a DRM code with a digital content, the DRM code comprising a computer virus characteristic comprising the DRM code is being hidden in a memory; performing DRM by executing the DRM code prior to performing the digital content in a user terminal such that the DRM authorizes or prohibits the performance of the digital content in the user terminal based, at least in part, upon DRM information generated by the DRM code; and tracking with respect to the digital content based on the DRM information, wherein the DRM information is updated in accordance with activities with respect to the digital content wherein the DRM code performs a DRM function when the digital content is played using the computer virus characteristic, and the computer virus characteristic is provided in another program and privately performs a function, wherein the DRM information comprises an Internet Protocol (IP) address, a play time of the digital content, a number of plays thereof, and a number of distributions thereof, wherein a distribution level and a utilization level of the digital content are identified by analyzing the IP address, the play time, the number of plays, and the number of distributions, and wherein the play or the distribution of the digital content is restricted based on the identified distribution level and utilization level.

19. A system for performing Digital Rights Management (DRM) and tracking with respect to a digital content, the system comprising: a DRM code providing component configured to associate a DRM code with a digital content, the DRM code comprising a computer virus characteristic comprising the DRM code is being hidden in a memory; and a DRM and tracking performing component configured to perform DRM by executing the DRM code prior to performing the digital content in a user terminal such that the DRM authorizes or prohibits the performance of the digital content in the user terminal based, at least in part, upon DRM information generated by the DRM code, and configured to track with respect to the digital content based on the DRM information, wherein the DRM information is updated in accordance with activities with respect to the digital content wherein the DRM code performs a DRM function when the digital content is played using the computer virus characteristic, which is provided in another program and which privately performs a function, wherein the DRM information comprises an IP address, a play time of the digital content, a number of plays thereof, and a number of distributions thereof, wherein a distribution level and a utilization level of the digital content are identified by analyzing the IP address, the play time, the number of plays, and the number of wherein the play or the distribution of the digital content is restricted based on the identified distribution level and utilization level.

20. The system of claim 19, wherein the DRM function comprises a function of generating the DRM information associated with the digital content, and a function of transmitting the DRM information to the DRM system.

21. The system of claim 19, wherein the DRM and tracking performing component comprises:

a DRM information receiving component configured to receive the DRM information from a terminal configured to download the digital content;

an information extraction component configured to extract the IP address, the play time, the number of plays, and the number of distributions from the DRM information; and an identification component configured to identify the distribution level and the utilization level of the digital content by analyzing the extracted IP address, the play time, the number of plays, and the number of distributions.

* * * * *